United States Patent [19]

Vander Hoek

[11] Patent Number: 4,946,116
[45] Date of Patent: Aug. 7, 1990

[54] ENGINE MOUNT INCLUDING LATCH MECHANISM

[75] Inventor: John Vander Hoek, Bainbridge Island, Wash.

[73] Assignee: The Boeing Company, Seattle, Wash.

[21] Appl. No.: 285,053

[22] Filed: Dec. 14, 1988

[51] Int. Cl.⁵ .................................. B64D 27/00
[52] U.S. Cl. .................................. 244/54; 248/554
[58] Field of Search .............. 244/54, 158 R, 118.1; 248/554–557; 292/DIG. 49, DIG. 60, 256.75, 113, 247, 256.5

[56] References Cited

U.S. PATENT DOCUMENTS

| | | |
|---|---|---|
| 334,615 | 1/1886 | Rose . |
| 1,047,588 | 12/1912 | Stull .......................... 292/256.75 |
| 1,694,474 | 12/1928 | Lainer . |
| 1,983,050 | 12/1934 | Sizer . |
| 2,783,003 | 2/1957 | Ralston et al. .................. 244/54 |
| 2,815,184 | 12/1957 | Westphal et al. ................ 244/54 |
| 2,904,141 | 9/1959 | Henrichs ....................... 292/113 |
| 3,021,162 | 2/1962 | Jahn ........................ 292/DIG. 49 |
| 3,815,849 | 6/1974 | Mesten ......................... 244/160 |
| 3,888,528 | 6/1975 | Jericijo ..................... 292/DIG. 49 |
| 4,218,081 | 8/1980 | Johnson ..................... 292/DIG. 49 |
| 4,718,632 | 1/1988 | Meineke . |

Primary Examiner—Galen Barefoot
Attorney, Agent, or Firm—Seed and Berry

[57] ABSTRACT

An improved engine mount is disclosed which includes a latching mechanism for latching a pivotal jaw to a stationary jaw, thereby defining an engine pin housing. The latching mechanism is of the over-center type which provides a locking force to the latched engine mount. The latch includes locking members which may be remotely operated thereby allowing remote latching and unlatching of the engine mount.

33 Claims, 4 Drawing Sheets

ENGINE MOUNT INCLUDING LATCH MECHANISM

GOVERNMENT RIGHTS

This invention was made with Government support under contract No. F33657-86-C-2085 awarded by the United States Air Force. The Government has certain rights in this invention.

TECHNICAL FIELD

The present invention is directed toward thrust mounts for the engine of an aircraft, and more particularly, toward an improved thrust mount including a latch mechanism for latchably mounting the engine to the body of the aircraft.

BACKGROUND OF THE INVENTION

Generally engine stabilizing mounts and thrust mounts are used for mounting an engine to the body of an aircraft. Engine stabilizing mounts are provided for maintaining the engine in position against the force of gravity. Thrust mounts are provided for maintaining a fixed relation between the position of the engine and the position of the aircraft body when the engine is operational and providing a thrusting force to propel the body forward. The present invention is directed toward the latter type of mount, i.e., thrust mounts.

Prior art thrust mounts generally comprise a first jaw fixed to the aircraft body and a second jaw pivotal thereto. The first and second jaws cooperate to define an engine pin housing for receiving the thrust pin of the aircraft engine. A nut-and-bolt structure clamps the pivotal jaw to the stationary jaw, thereby securing the engine to the body of the aircraft. The bolt structure must be tightened to a predetermined torque using a torque wrench, as is known in the art. However, the requirement of a torque wrench to assemble prior art engine mounts places severe restriction on the time, place and materials necessary to remove, repair and reassemble the aircraft engine. Accordingly, it is desirable to provide an engine mount which may be assembled without the need of a torque wrench or other specialized equipment.

Further, the engine of the aircraft is typically located on a portion of the aircraft body which is not readily accessible to maintenance personnel. This inaccessibility, in addition to the need for a torque wrench, further frustrates maintenance of the engine, making it difficult for maintenance personnel to access and assemble and/or disassemble prior art engine mounts. Accordingly, it is desirable to provide an engine mount which may be easily operated, for assembly and/or disassembly, from a remote location.

Still further, the engine mount of the aircraft must be highly resistant to vibration, forces, and stresses created by the operation of the engine. Accordingly, it is necessary that the force with which the jaws are clamped is precise to within predetermined tolerances. It is further necessary that the precise clamping force be readily repeatable. Therefore, it is desirable to provide an engine mount which may be assembled without a torque wrench and yet will clamp the jaws of the mount with predetermined, repeatable force to within specified tolerances.

SUMMARY OF THE INVENTION

It is therefore a primary object of the present invention to provide an engine mount for use with aircraft which may be readily assembled and disassembled without the need for a torque wrench or other specialized equipment.

It is a further object of the present invention to provide an engine mount which may be readily assembled and disassembled without the need of a torque wrench, and further, which will clamp the jaws of the engine mount together with a predetermined, repeatable force to within specified tolerances.

It is a still further object of the present invention to provide an engine mount which may be readily assembled and disassembled without the need of a torque wrench and which may be operated readily from a remote position by maintenance personnel.

These and other objects of the present invention are met by the improved engine mount disclosed herein. The improved engine mount includes a jaw assembly for defining an engine pin housing in which the engine pin may be mounted. The jaw assembly includes a first jaw adapted to be fixedly mounted to the body of the aircraft and a second jaw adapted to be engaged with the first jaw to define the engine pin housing. The improved engine mount further includes a latching mechanism for selectively latching the second jaw to the first jaw. The latching mechanism includes a locking arm and a linking member for transferring a latching force between the first and second jaws. The linking member is coupled to the locking arm such that displacement of the linking member results in displacement of the locking arm to provide the latching force.

In alternative embodiments, the engine mount comprises apparatus for remotely operating the latching mechanism. Particularly, in one preferred embodiment, the remote operation apparatus includes positioning members for selectively maintaining the position of the locking arm substantially constant relative to the position of the linking member. The positioning members are adapted to maintain the substantially constant relative positioning when the latching mechanism is unlatched.

In another alternative embodiment of the invention, the latching mechanism includes apparatus for locking the latch means in the latched position. In this embodiment, the remote operation apparatus may further include means for remotely operating the locking apparatus, thereby further allowing remote operation of the engine mount.

DETAILED DESCRIPTION OF THE DRAWINGS

Figure 1:
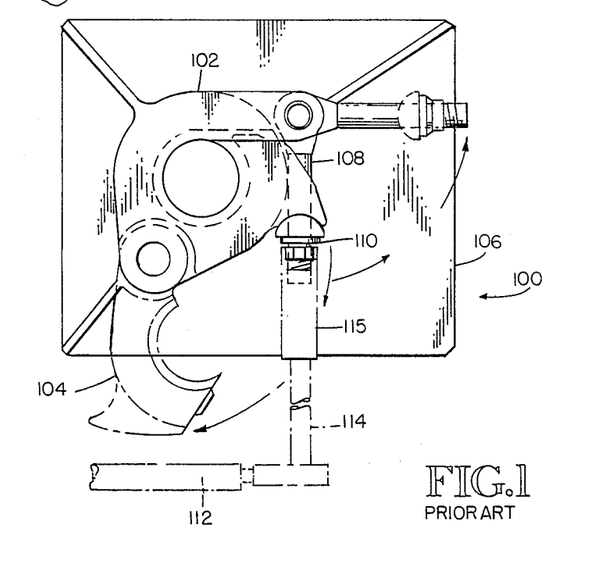
FIG. 1 is an elevational view of a prior art engine mount.

A prior art engine mount 100 is illustrated in FIG. 1. The engine mount 100 includes a stationary jaw 102 and a pivotal jaw 104, both mounted on a support frame 106, the support frame being mounted to the aircraft frame. In the prior art engine mount 100, the pivotal jaw is secured to the stationary jaw by a pivoting bolt 108 and a lug 110, which is threaded to the bolt 108.

In operation, a mechanic wishing to release the pivotal jaw 104 from the stationary jaw 102 must provide a wrench 112, including a shank 114 terminating in a socket 115 to engage the lug 110 and thereby unscrew the lug to release the bolt 108 such that the pivotal jaw may pivot away from the stationary jaw. To reassemble the prior art mount 100, the wrench 112 must be able to tighten the nut 110 to a predetermined torque. The wrench 112 must thus be a conventional torque wrench. Still further, due to the typical positioning of the engine within the aircraft body, the shank 114 must be elongated in order to engage the wrench 112 with the nut 110. Also, the positioning of the pivotal jaw and the bolt 108 must be done remotely, often without the opportunity to view the mount 100. As mentioned above, this procedure is both time-consuming and tedious.

Figure 2:
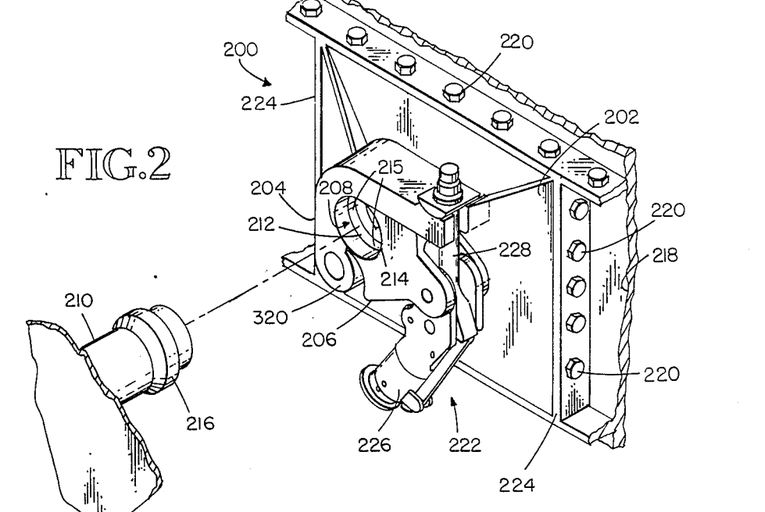
FIG. 2 is an isometric view of the subject engine mount, including the latching mechanism, and illustrates the manner in which the engine mount is attached to the aircraft frame for receiving the thrust pin of the aircraft engine.

An improved engine mount 200, which is the subject of the present invention, is illustrated in FIG. 2. The engine mount 200 includes a support frame 202 upon which is integrally mounted a stationary jaw 204. A pivotal jaw 206 is pivotally mounted to the stationary jaw at a clevis joint 320, as will be described more fully below. The stationary jaw 204 and pivotal jaw 206 cooperate to define an engine pin housing 208 for receiving an engine thrust pin 210 of the aircraft engine (not shown). The stationary jaw 204 includes a retaining groove portion 212 and the pivotal jaw 206 includes a retaining groove 214 which cooperate to define a continuous retaining groove 215 about the periphery of the engine pin housing 208. The engine thrust pin 210 includes an annular ring 216 about the periphery thereof for mating with the continuous retaining groove defined by grooves 212 and 214.

The engine mount 200 is adapted to be mounted to the aircraft frame, a portion of which is illustrated as frame portion 218. In the presently preferred embodiment of the invention, the engine mount 200 is mounted to the frame portion by securely bolting the support surface 202 to mounting flanges 224 via a plurality of bolts 220. Other means may be provided for mounting the engine mount 200 to the frame of the aircraft.

The engine mount 200 includes a novel latching mechanism 222 provided for releasably engaging the pivotal jaw 206 with the stationary jaw 204 by transferring a latching force therebetween. The latching mechanism 222 of the present invention is the "over-center" variety, as will be discussed below. The latching mechanism 222 includes a linking member and a locking arm for transferring the latching force to the stationary jaw 204 and the pivotal jaw 206. In the presently preferred embodiment of the invention, the linking member and locking arm comprise a latch handle 226 and a bolt 228, respectively, adapted for quickly coupling and decoupling the pivotal jaw 206 to the stationary jaw 204 to thereby provide the latching force. The latch mechanism thereby provides a means for quickly releasing the pivotal jaw 206 such that the engine may be as quickly removed. Further, the latching mechanism eliminates the need for a torque wrench while providing means for repeatable clamping of the pivotal jaw 206 to the stationary jaw 204 with a predetermined force. The latching mechanism 122 can also be easily operated from a remote position, as will be described in more detail below.

Figure 3:
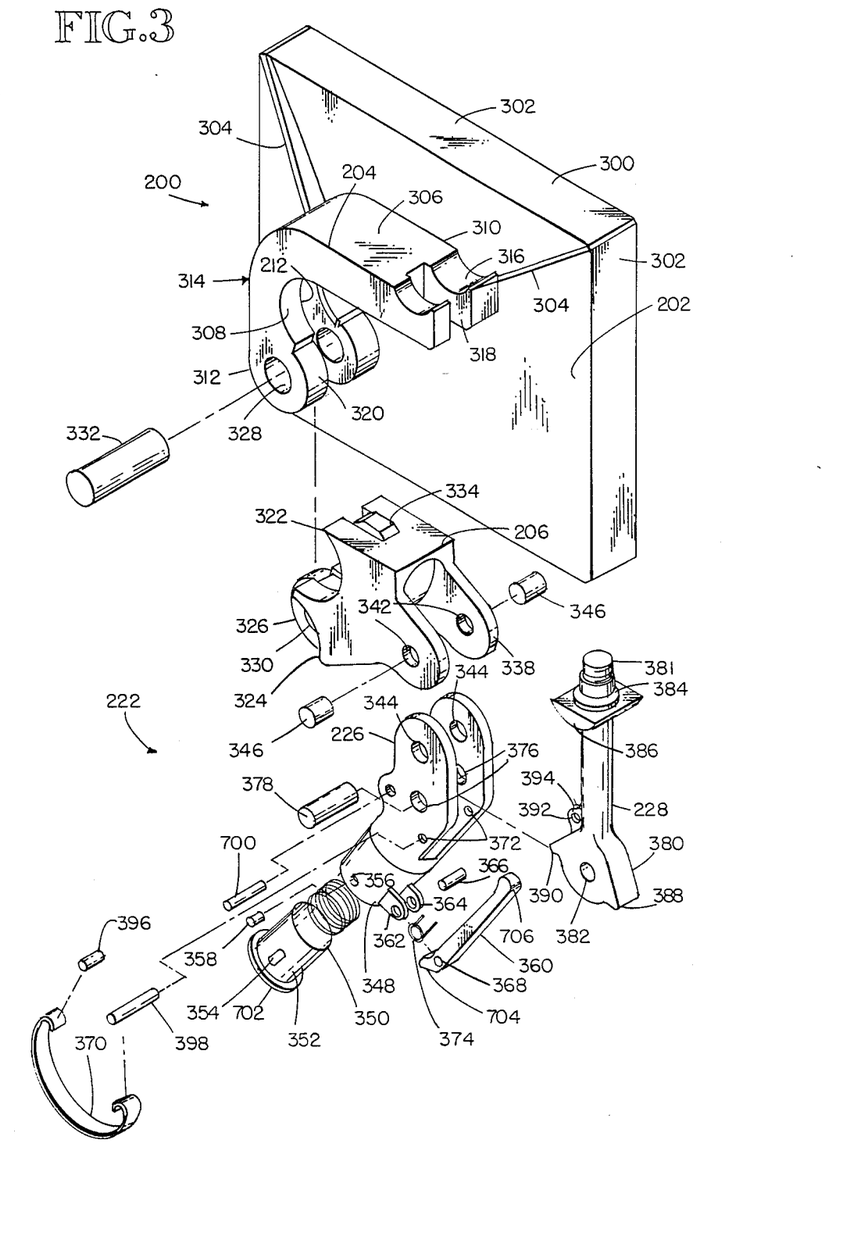
FIG. 3 is an exploded isometric view of the subject engine mount.

With respect to FIG. 3, wherein like elements have been given like reference numerals, the engine mount 200 and latching mechanism 222 will be described in more detail. As shown therein, the engine mount 200 includes a frame 300 wherein the frame includes the support surface 202. The frame 300 further includes support flanges 302 about the periphery of the support surface 202 and angled thereto. The support flanges are provided for mating with the mounting flanges 224 of the aircraft frame 218 so that the frame 300 may be securely mounted to the aircraft as described above.

Figure 4:
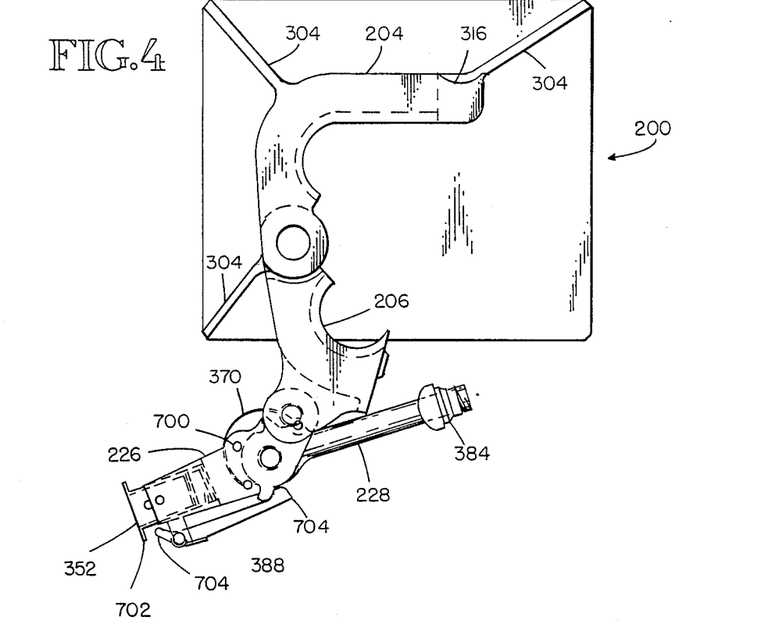
FIGS. 4 through 7 are front elevational views of the subject engine mount, illustrating the manner in which the engine mount is latched and unlatched.
Figure 5:
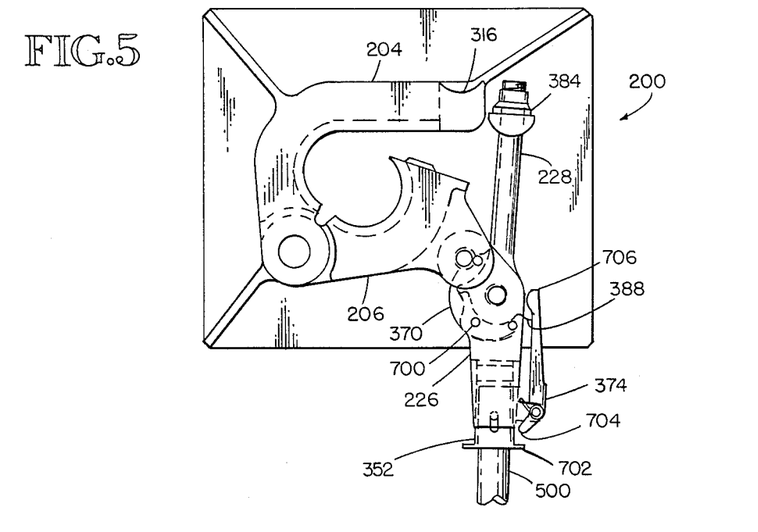

The support surface 202 has a plurality of support ribs 304 extending vertically therefrom. The support ribs 304 are each integral portions of the frame 300 and the stationary jaw 204. The support ribs 304 add rigidity to engine mount 200 and particularly to the stationary jaw 204. In the presently preferred embodiment of the invention, three support ribs 304 are provided, as illustrated in FIG. 4.

The stationary jaw 204 includes an exterior face 306 and an interior face 308. The retaining groove 212, described above, is formed on the interior face 308 of the stationary jaw. The stationary jaw 204 further includes a first end portion 310 and a second end portion 314 wherein the first end portion is angled with respect to the second end portion. The first end portion 310 includes a saddle block 316 which is formed on the exterior face 306 at the end of the first end portion 310 of the stationary jaw 204. A bolt channel 318 is formed at the end of the first end portion 310 and extends from the exterior face 306 to the interior face 308 thereof for receiving the bolt 228 of the latching mechanism 222. The second end portion 314 of the stationary jaw 204 includes a clevis joint 320 for pivotally engaging the pivotal jaw 206, as will be described below.

The pivotal jaw 206 includes a locking end portion 322 and a pivotal end 324 wherein the pivotal end 324 is angled with respect to the locking end 322. The pivotal end 324 includes a lug 326 which is adapted to be engaged with the clevis joint 320. In the presently preferred embodiment of the invention, the clevis joint 320 and the lug 326 include mating through-holes 328 and 330, respectively, for receiving a pin 332. The diameter of the through-hole 330 of the lug 326 is made slightly larger than the through-hole 328 of the clevis joint 320, such that the pin 332 will frictionally engage the through-hole 328 yet allow free rotational movement of the lug 326 and, consequently, allow free rotation of pivotal jaw 206. In the presently preferred embodiment of the invention, the pin 332 is "shrink-fit" to the clevis joint 320, i.e., the temperature of the pin 332 is reduced, thereby to slightly reduce its size so that it may be force fit to the through-hole 328. When the pin 332 is returned to its normal temperature it expands, thereby securing the pin to the through-hole.

The pivotal jaw 206 further includes a dowel 334 at the end of the locking end 322. The dowel 334 is adapted to mate with the retaining groove portion 212 of the stationary jaw 204 when the pivotal jaw 206 is engaged with the stationary jaw 204, as shown in FIG. 2. The dowel 334 cooperates with the retaining groove portion 212 to add rigidity to the latched engine mount 200.

In the presently preferred embodiment of the invention, the latching mechanism 222 is pivotally coupled to the pivotal jaw 206 such that angular displacement of the latch handle 226 results in application of the latching force. More particularly, the latch handle 226 is pivotally coupled to the pivotal jaw 206 to define a first latch pivot and pivotally coupled to the bolt 228 to define a second latch pivot. Accordingly, the pivotal jaw 206 includes a clevis joint 338 which is adapted to mate with a clevis joint 340 of the latch handle 226. The clevis joint 340 is adapted to fit interior of, and mate with, the clevis joint 338 to define the first latch pivot. Each clevis joint 338 and 340 includes matching through-holes 342 and 344, respectively, for receiving coupling pins 346. As with the clevis joint 320 and lug 326, the through-hole 342 of the clevis joint 338 is of a diameter slightly smaller than the diameter of the through-hole 344 of the clevis joint 340, thereby to allow the latch handle 226 to pivot with respect to the pivotal jaw 206. The pins 346 are shrink-fit to frictionally engage the through-holes 342 in the same manner as the pin 332 and through-hole 328 described above. Two pins 346 are provided to maintain a clearance interior of the clevis joint 340 through which the bolt may move, as illustrated in FIG. 2.

Returning to FIG. 3, the second latch pivot, between the latch handle and the bolt 228, is also formed in the clevis joint 340 of the latch handle 226. The latch handle 226 includes through-holes 376 for receiving a pin 378. In similar manner, the bolt 228 includes a through-hole 382 provided for mating with the through-hole 376 of the latch handle 226 to define the second latch pivot. The diameters of the through-holes 376 are made slightly smaller than the diameter of the through-hole 382 such that the bolt 228 will be allowed to freely pivot with respect to the latch handle 226 when the pin 378 is frictionally engaged in the through-holes 376.

The bolt 228 has first and second ends 380 and 386, respectively, and includes a self-locking nut 384 which is adapted to be threadably mounted to the second end 381 of the bolt 228. The first end of the bolt 228 includes first and second projecting portions 388 and 390, the functions of which will be described below. The nut 384 includes a saddle portion 386 which is shaped to mate with the saddle block 316 of the stationary jaw 204. The nut 384 is provided for coupling the bolt 228 to the stationary jaw 204, via the saddle block 316 and saddle portion 386, thereby defining a third latch pivot.

The latching force between the stationary jaw 204 and the pivotal jaw 206 is provided by selective positioning of the first, second and third latch pivots and the nut 384. Since the latching force is greatest when the first, second and third latch pivots are aligned, the maximum latching force may be adjusted by adjusting the position of the nut 384. Further, because the latch is unstable when the three pivots are aligned, it is desirable to position the latch pivots slightly out of alignment for operation. Accordingly, the maximum latching force achieved when the latch pivots are aligned must be slightly greater than the desired latching force for operation. The differential provides a cushion, or tolerance, which must be overcome for intentional and unintentional unlatching, as will be described below. The manner in which the latch pivots are positioned for operation will be described below.

The bolt 228 further includes a clevis joint 394 mounted upon the first end 380 thereof. The clevis joint 394 includes a through-hole 392 adapted for receiving a pin 396. As described above, the pin 396 is to be shrink-fit to the clevis joint 394. A leaf spring 370 is adapted for mounting upon the pin 396 thereby securing the leaf spring 370 to the bolt 228. A pair of through holes 372 formed within the latch handle 226 are adapted to frictionally receive a pin 398. The pin 398 extends through the clevis of the latch handle to engage both through-holes 372. The leaf spring 370 is adapted to be mounted to the pin 398, intermediate the latch handle 226 and the bolt 228, thereby to secure the leaf spring 370 to the latch handle 226. The leaf spring 370 operates to maintain fixed the relative positioning of the latch handle 226 to the bolt 228 when the latch is unlatched, as will be described below.

The latch handle 226 has an end chamber 348 formed in the end thereof for receiving a spring 350 and a plunger 352. The plunger 352 includes an oval-shaped through-hole 354 which is adapted to mate with a through-hole 356 in the end of the end chamber 348. A pair of pins 358 are shrink-fit to the through-holes 356 of the latch handle 226 and extend inward of the through-holes 354 of the plunger 352. The through-hole 354 has an oval shape so that the plunger 352 can move linearly in and out of the end chamber 348, the pins 358 acting as guide pins and the spring 350 biasing the plunger 352 out of the end chamber 348.

The latch handle 226 includes a clevis joint 362 which is adapted for rotationally mounting a pawl 360 to the latch handle 226. A through-hole 364 is formed in the clevis joint 362 and is made of a diameter slightly less than the diameter of a through-hole 368 formed in the end of the pawl 360. A pin 366 is shrink-fit to the through-hole 364 so that the pawl 360 may be pivotally mounted to the latch handle 226. A leaf spring 374 is adapted to be mounted to the pawl 360 prior to mounting the pawl to the latch handle 226 so that, when assembled, the leaf spring 374 will bias the pawl 360 toward the latch handle 226. The pawl 360, leaf spring 374, and projecting portion 388 cooperate to lock the latching mechanism 222 in the latched position, as will be described more fully below.

With reference to FIGS. 4 through 7, the operation of the engine mount 200 will be described. In FIG. 4, the engine mount is shown with the pivotal jaw 206 spaced from the stationary jaw 204 such that the engine pin 210 (FIG. 2) may be released or inserted in the engine mount 200. The leaf spring 370 is provided for maintaining the latch handle 226 and the bolt 228 in a fixed angular relationship when the engine mount 200 is unlatched. Maintaining the bolt 228 and the latch handle 226 in a fixed angular relationship facilitates engaging the bolt 228 with the saddle block 316 by manipulating the latch handle 226, thereby facilitating latching of the engine mount 200 from a remote location.

Figure 6:
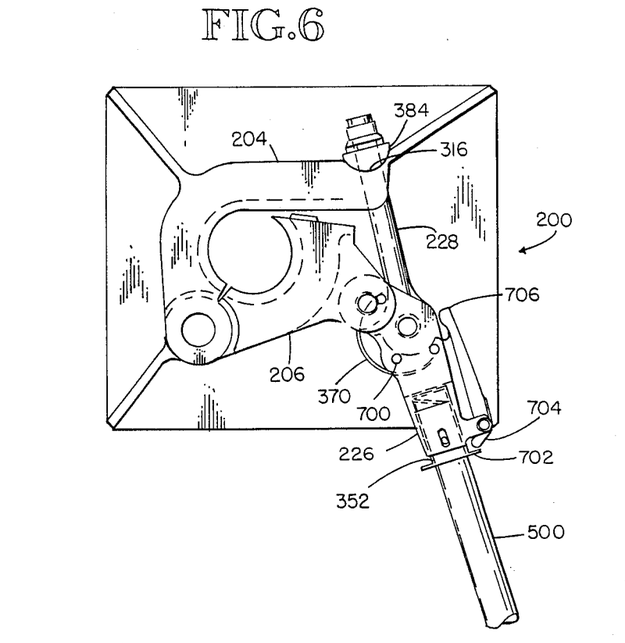

To engage the pivotal jaw 206 with the stationary jaw 204, a crowbar or other elongate tool 500 is inserted in the plunger 352 of the latch handle 226. The leaf spring 370 maintains the bolt 228 in fixed angular relationship with the latch handle 226 such that the bolt 228 becomes, essentially, an extension of the crowbar 500. The operator positions the locking nut 384 in the saddle block 316, as shown in FIG. 6, and pulls downwardly on the crowbar 500, thereby pulling the seCond latch pivot under the first latch pivot to create an over-center latching arrangement between the first, second and third latch pivots.

As is known, there exists an equilibrium position wherein the force required to move the latch handle 226 in one direction, e.g, the unlatching direction, is equal to the force required to move the latch handle in a second direction, e.g., the latching direction. At equilibrium, the latch pivots are aligned and the latching force is maximized. Continued movement of the second pivot beyond equilibrium: (1) decreases the latching force; (2) increases the force necessary to release the latch; and (3) decreases the probability of unintentional unlatching. Preferably, the latch is designed so that the latch handle may be moved only a predetermined distance beyond equilibrium in the latching direction. This distance is determined by the user's needs in trading off the force required to unlatch the engine mount with the chance of unintentional unlatching which may result from rocking, turbulence, bumping, and other predictable yet undesired forces.

It will be apparent to those skilled in the art that the over-center latching structure of the present invention will allow the latching force of the engine mount 200 to be readily repeated to within acceptable tolerances by adjusting the nut 384 upon initial installation. Further, the magnitude or repeatability is not affected by the trade-off discussed above.

Figure 7:
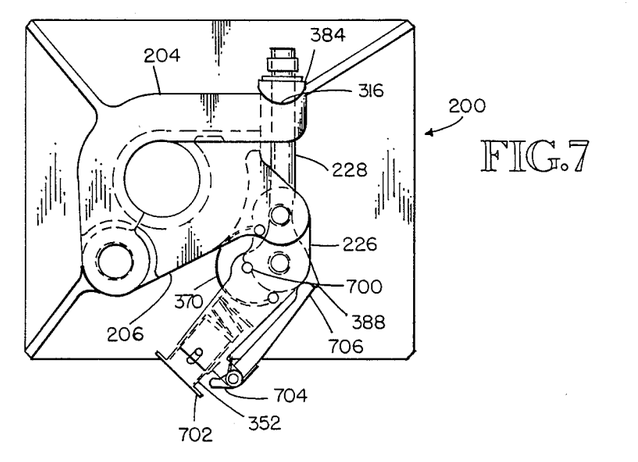

To ensure that the latch handle may not be moved beyond a predetermined distance from equilibrium in the latching direction, a pin 700 is mounted in the latch handle 226, as shown in FIG. 7. The pin 700 is shrink-fit in the same manner as the pin 332, described above with respect to FIG. 3. The pin 700 is adapted to engage the projecting portion 390 of the bolt 228, thereby to prevent the latch handle from being moved beyond a predetermined distance from equilibrium in the latching direction.

Further with respect to FIG. 7, a locking mechanism is shown which allows the latching mechanism to be locked in the latched position and to be remotely unlocked. The locking mechanism includes the pawl 360 and the spring 374. As shown, the plunger 352 includes a rim 702 which is adapted to engage an end portion 704 of the pawl 360. The pawl 360 further includes a locking end portion 706 which is adapted to engage the projecting portion 388 of the bolt 228.

When the latching mechanism 222 is locked, the spring 374 biases the pawl 360 toward the latch handle 226 and the bolt 228 such that the locking end portion 706 abuts the projecting end portion 388, thereby to prevent the latch handle 226 from being moved in the unlatching direction. To disengage the pawl from the projecting portion 388, the crowbar 500 is inserted within the plunger 352 with enough force such that the rim 702 of the plunger 352 engages the end portion 704 of the pawl 360, thereby to pivot the pawl 360 away from the latch handle 226 and the bolt 228 such that the locking end portion 706 is released from the projecting portion 388. The latch handle is then moved in the unlatching direction, thereby to release the bolt 228 and nut 384 from the saddle block of the fixed jaw 204 (see FIG. 6). When the crowbar 500 is removed from the latch handle 226, the plunger 352 is returned to its original position under the force of the spring 350.

While only several presently preferred embodiments of my novel engine mount including a latching mechanism have been described in detail herein, many modifications and variations thereof will become readily apparent to those skilled in the art. It is therefore my intention to embody all such variations and modifications as fall within the true scope and spirit of my invention.

I claim:

1. An improved engine mount for mounting an aircraft engine to the body of the aircraft, wherein the engine includes an engine pin adapted to be mounted to the body of the aircraft, said engine mount comprising:
    jaw means for defining an engine pin housing within which the engine pin may be positioned, said jaw means including a first jaw adapted to be fixedly mounted to the body of the aircraft and a second jaw adapted to be selectively engaged with said first jaw to define the engine pin housing;
    latching means for selectively latching said second jaw to said first jaw by providing a latching force therebetween, said latching means including a locking arm and a linking member for transferring the latching force to said first and second jaws, said linking member being pivotally coupled to said locking arm and said jaw means such that angular displacement of said linking member results in displacement of said locking arm to thereby provide the latching force;
    first and second locking members coupled to said linking member and said locking arm, respectively, said first and second locking members being positioned to be selectively engaged to thereby lock said latching means in the latched position; and
    plunger means for selectively disengaging said first and second locking members to allow said latching means to be disengaged.

2. The engine mount as recited in claim 1 wherein said latching means further comprises means for coupling said first jaw to said locking arm, thereby to provide the latching force.

3. The engine mount as recited in claim 2, further comprising means for remote operation of said latching means.

4. The engine mount as recited in claim 2, further comprising positioning means for selectively maintaining the position of said locking arm substantially constant relative to the position of said linking member, said positioning means being adapted to maintain the substantially constant relative positioning when said latching means is unlatched.

5. The engine mount as recited in claim 4 wherein said positioning means comprises a leaf spring fixed to said locking arm and said latch handle.

6. The engine mount as recited in claim 2 wherein said latching means further comprises means for locking said latch means in the latched position.

7. The engine mount as recited in claim 2 wherein said latching means further comprises means for adjusting the latching force between said first and second jaws.

8. The engine mount as recited in claim 2 further comprising means for restricting the movement of said linking member when said latching means is latched.

9. The engine mount as recited in claim 1 wherein said linking member comprises a latch handle pivotally coupled to said second jaw and wherein said locking arm comprises a bolt adapted for selective engagement with said first jaw, said engine mount further comprising seating means for releasably engaging said bolt and said first jaw, thereby to latch said latching means such that said first jaw is in engagement with said second jaw.

10. The engine mount as recited in claim 1 wherein said locking means further comprises means for biasing said first member into engagement with said second member.

11. The engine mount as recited in claim 6 wherein said linking member includes a plunger channel extending from the end of said linking member to an interior end wall of said linking member, said first locking member comprises a pawl pivotally coupled to said linking member, said second locking member comprises a projecting portion projecting from said locking arm, and wherein said plunger means comprises a plunger positioned within said plunger channel and spring biased outwardly thereof, said plunger including a rim extending about the periphery thereof adapted to engage said pawl when said plunger is depressed within said latch handle to pivot said pawl out of engagement with said projecting portion and thereby allow said latching means to be disengaged.

12. The engine mount as recited in claim 11 wherein said plunger further includes a lever channel extending from said rim interior of said plunger to an end wall of said plunger, said lever channel being adapted to receive a lever to thereby allow remote operation of said latching means.

13. An improved engine mount for mounting an aircraft engine to the body of an aircraft, comprising:
    a stationary jaw having a first end portion and a second end portion angled with respect to said first end portion;
    means for fixedly mounting said stationary jaw to the body of the aircraft;
    pivoting jaw means pivotally coupled to said stationary jaw for engaging said stationary jaw to define an engine pin housing within which the engine pin of the aircraft engine may be received;
    latching means for latching said pivoting jaw means to said stationary jaw when said pivoting jaw means is in engagement with said stationary jaw, said latching means including a latch handle pivotally coupled to said pivoting jaw means and a bolt pivotally coupled to said latch handle;
    seating means for providing releasable engagement between said bolt and said stationary jaw, thereby to couple said latching means to said stationary jaw so that said stationary jaw can be latched to said providing jaw means;
    first and second locking members coupled to said latch handle and said bolt, respectively, said first and second locking members being positioned to be selectively engaged to thereby lock said latching means in the latched position; and
    plunger means for selectively disengaging said first and second locking members to allow said latching means to be disengaged.

14. The engine mount as recited in claim 13 wherein said pivotal jaw further comprises a dowel and wherein said fixed jaw includes a restraining groove adapted to mate with said dowel when said pivoting jaw means is latched to said stationary jaw to thereby restrict the movement of said stationary jaw relative to said pivoting jaw means.

15. The engine mount as recited in claim 13 wherein said latch handle includes a plunger channel extending from the end of said latch handle to an interior end wall of said latch handle, said first locking member comprises a pawl pivotally coupled to said latch handle, said second locking member comprises a projecting portion projecting from said bolt, and wherein said plunger means comprises a plunger positioned within said plunger channel and spring biased outwardly thereof, said plunger including a rim extending about the periphery thereof adapted to engage said pawl when said plunger is depressed within said latch handle to pivot said pawl out of engagement with said projecting portion and thereby allow said latching means to be disengaged.

16. The engine mount as recited in claim 15 wherein said plunger further includes a lever channel extending from said rim interior of said plunger to an end wall of said plunger, said lever channel being adapted to receive a lever to thereby allow remote operation of said latching means.

17. The engine mount as recited in claim 16 wherein said latching means further includes a spring positioned within said plunger channel intermediate the end walls of said latch handle and said plunger to bias said plunger outwardly of said plunger channel.

18. The engine mount as recited in claim 13 wherein said locking means further comprises means for biasing said first member into engagement with said second member.

19. The engine mount as recited in claim 13 further comprising positioning means for selectively maintaining said bolt in a substantially constant relative positioning with said latch handle, said positioning means being adapted to maintain the substantially constant relative positioning when said latching means is unlatched.

20. The engine mount as recited in claim 19 wherein said positioning means comprises a leaf spring fixed to said bolt and said latch handle.

21. The engine mount as recited in claim 13 wherein the pivotal connection between said latch handle and said pivoting jaw means is adapted to be positioned substantially intermediate the point at which said bolt is seated within said seating means and the pivotal connection between said bolt and said latch handle to create an overcenter latch structure.

22. The engine mount as recited in claim 21, further comprising locking means for locking said latching means in the latched position.

23. The engine mount as recited in claim 22, further comprising positioning means for selectively maintaining said bolt in a substantially constant position relative to said latch handle, said positioning means being adapted to maintain the substantially constant relative positioning when said latching means is unlatched.

24. The engine mount as recited in claim 23 wherein said locking means comprises:
    first and second locking members coupled to said latch handle and said bolt, respectively, said first and second locking members being positioned to be selectively engaged to thereby lock said latching means in the latched position; and
    plunger means for selectively disengaging said first and second locking members to allow said latching means to be disengaged.

25. The engine mount as recited in claim 24 wherein said latching means further comprises adjust means for adjusting the force required to latch said latch means.

26. The engine mount as recited in claim 25 wherein said seating means comprises a saddle block positioned on the exterior face of said first end of said stationary jaw and a bolt channel extending from the exterior face of said stationary jaw to the interior face thereof, said bolt channel further extending from said saddle block to said first end, said bolt being adapted to be inserted within said bolt channel so that said bolt is seated in said saddle block to thereby latch said pivoting jaw to said stationary jaw.

27. The engine mount as recited in claim 26 wherein said adjust means comprises a nut threadably engageable with said bolt and adapted to be seated in said saddle block.

28. The engine mount as recited in claim 26, further comprising means for remote operation of said locking means.

29. The engine mount as recited in claim 28 wherein said means for remote operation comprises a lever channel extending from the end of said plunger to an interior end wall thereof for receiving a lever to allow remote operation of said locking means.

30. The engine mount as recited in claim 28, further comprising means for restricting the movement of said latch handle to minimize the force necessary to unlatch the latching means.

31. An improved engine mount for releasably mounting the engine of an aircraft to the body of the aircraft, said engine mount comprising:
   a rigid frame including a support surface having a support flange about the periphery thereof and angled thereto, said support surface having a plurality of supporting ribs extending therefrom for increasing the rigidity of said support surface, said support flange being adapted to be fixed to the body of the aircraft;
   a stationary jaw integral with said support surface, said stationary jaw having a first end portion and a second end portion angled with respect to said first end portion, said first end portion including a saddle block on the exterior face thereof and a bolt channel extending from the exterior face of said stationary jaw to the interior face thereof and further extending from said saddle block to said first end, said second end portion including a first clevis joint, said stationary jaw further including a first retaining groove on the interior face thereof extending from said first end portion to said second end portion;
   a pivoting jaw having a pivotal end and a locking end angled with respect to said pivotal end, said pivoting jaw also including a second retaining groove extending from said pivotal end to said locking end, said pivotal end including a lug for mating with said first clevis joint such that said locking end of said pivoting jaw is engageable with said first end of said stationary jaw, thereby to define an engine pin housing within which the engine pin of the aircraft engine may be mounted, said first and second retaining grooves cooperating to define a continuous retaining groove about the circumferences of said engine pin housing for retaining the engine pin of the aircraft engine, said locking end having a supporting dowel projecting therefrom for mating with said first retaining groove, said pivoting jaw further including a second clevis joint intermediate said pivotal end and said locking end;
   a latch handle having a third clevis joint at one end thereof and a plunger at the other end thereof, said third clevis joint being adapted to mate with said second clevis joint of said pivoting jaw, said plunger being seated within an end chamber of said latch handle and being spring biased away from said latch handle, said plunger including a rim about the periphery thereof extending out beyond the edge of said latch handle, said latch handle further including a first eye joint intermediate said third clevis joint and said plunger;
   a bolt having a self-locking nut threadably engaged to one end thereof and a second eye joint at the other end thereof, said nut being adapted to be seated in said saddle block of said stationary jaw with said bolt extending through said bolt channel thereof, said second eye joint for mating with said first eye joint of said latch handle, thereby to create an over-center latching mechanism to lock said pivoting jaw to said stationary jaw, said bolt further including a projecting portion at said eye joint end thereof;
   a pawl pivotally attached to said latch handle for engaging said projecting portion of said bolt when said pivoting jaw is in the latched position, said rim of said latch handle being adapted to engage said pawl when said plunger is depressed into said end chamber such that said pawl is pivoted out of engagement with said projecting portion to allow the latching mechanism to be unlatched;
   a leaf spring fixed to said bolt and said latch handle for maintaining substantially constant the relative positioning therebetween when said stationary jaw is not latched to said pivotal jaw; and
   means for pivotally coupling said clevis joint of said stationary jaw to said first lug of said pivoting jaw, said second clevis joint of said pivoting jaw to said third clevis joint of said latch handle, said first eye joint of said latch handle to said second eye joint of said bolt and said pawl to said latch handle.

32. The engine mount as recited in claim 31, further comprising means for restricting the movement of said latch handle when said stationary jaw is latched to said pivotal jaw.

33. The engine mount as recited in claim 31 wherein said plunger further includes a lever channel extending from said rim interior of said plunger to an end wall of said plunger, said lever channel being adapted to receive a lever to thereby allow remote operation of the latch mechanism.

* * * * *

UNITED STATES PATENT AND TRADEMARK OFFICE
CERTIFICATE OF CORRECTION

PATENT NO. : 4,946,116

DATED : August 7, 1990

INVENTOR(S) : John Vander Hoek

It is certified that error appears in the above-identified patent and that said Letters Patent is hereby corrected as shown below:

In claim 11, column 9, line 7, please delete "6" and substitute therefor --10--.

In claim 19, column 10, line 27, after "claim 13" please insert --,--.

Signed and Sealed this

Fifth Day of November, 1991

Attest:

HARRY F. MANBECK, JR.

Attesting Officer

Commissioner of Patents and Trademarks